(12) United States Patent
Rabhi

(10) Patent No.: US 9,435,336 B2
(45) Date of Patent: Sep. 6, 2016

(54) SEALING DEVICE FOR A PISTON

(71) Applicant: Vianney Rabhi, Lyons (FR)

(72) Inventor: Vianney Rabhi, Lyons (FR)

(*) Notice: Subject to any disclaimer, the term of this patent is extended or adjusted under 35 U.S.C. 154(b) by 296 days.

(21) Appl. No.: 14/338,518

(22) Filed: Jul. 23, 2014

(65) Prior Publication Data

US 2015/0035234 A1 Feb. 5, 2015

Related U.S. Application Data

(60) Provisional application No. 61/857,437, filed on Jul. 23, 2013.

(51) Int. Cl.
| | | |
|---|---|---|
| *F16J 1/00* | (2006.01) |
| *F04B 53/14* | (2006.01) |
| *F16J 15/16* | (2006.01) |
| *F16J 15/56* | (2006.01) |

(52) U.S. Cl.
CPC ............ *F04B 53/143* (2013.01); *F16J 15/164* (2013.01); *F16J 15/56* (2013.01)

(58) Field of Classification Search
CPC ...... F04B 53/143; F16J 1/005; F16J 15/164; F16J 15/56
USPC .......................................... 92/182, 256, 257
See application file for complete search history.

(56) References Cited

U.S. PATENT DOCUMENTS

| | | | | |
|---|---|---|---|---|
| 235,971 A * | 12/1880 | Stevens | ...................... | F16J 9/06 277/490 |
| 1,567,750 A * | 12/1925 | Profitlich | ................. | F16J 1/005 123/44 A |
| 2,460,948 A * | 2/1949 | Sander | .................. | F04B 53/143 92/258 |
| 3,353,456 A * | 11/1967 | Bauer | ..................... | F04B 37/12 277/449 |
| 3,605,602 A * | 9/1971 | Tyson et al. | ................ | F16J 1/12 92/187 |
| 4,044,655 A * | 8/1977 | Kennicott | ........... | F04B 39/0005 29/447 |
| 4,208,953 A * | 6/1980 | Prusic | ................. | F04B 39/0005 92/182 |
| 4,722,507 A * | 2/1988 | Lindackers | ............ | F16J 15/164 137/625.3 |

* cited by examiner

*Primary Examiner* — Thomas E Lazo

(74) *Attorney, Agent, or Firm* — Young & Thompson

(57) ABSTRACT

The sealing device (1) for a piston (2) of which the fixed skirt (5) moves in a cylinder (8) includes a sliding skirt (6) traversed axially by a pressure transmission channel (10) and connected to the fixed skirt (5) by a mechanical inter-skirt connection (7) whilst an extensible continuous segment (9) is interposed in a sealed manner between the skirts (5, 6) and can come into contact with the cylinder (8) when its internal cylindrical segment face (12) is subjected to the pressure of a fluid (36) via the pressure transmission channel (10), a sliding skirt spring (16) tending to bring the skirts (5, 6) closer and to axially compress the extensible continuous segment (9) between the skirts (5, 6).

13 Claims, 6 Drawing Sheets

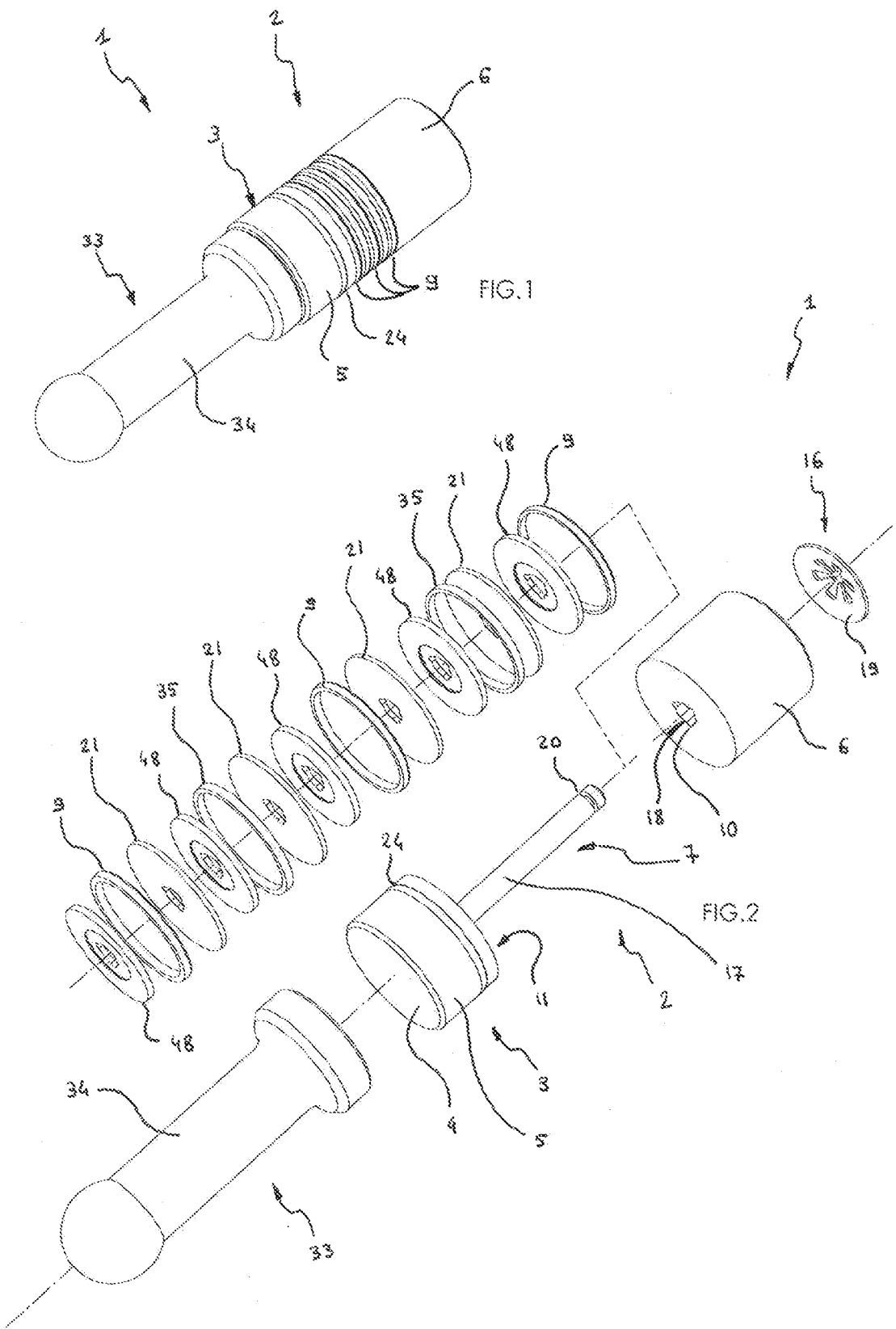

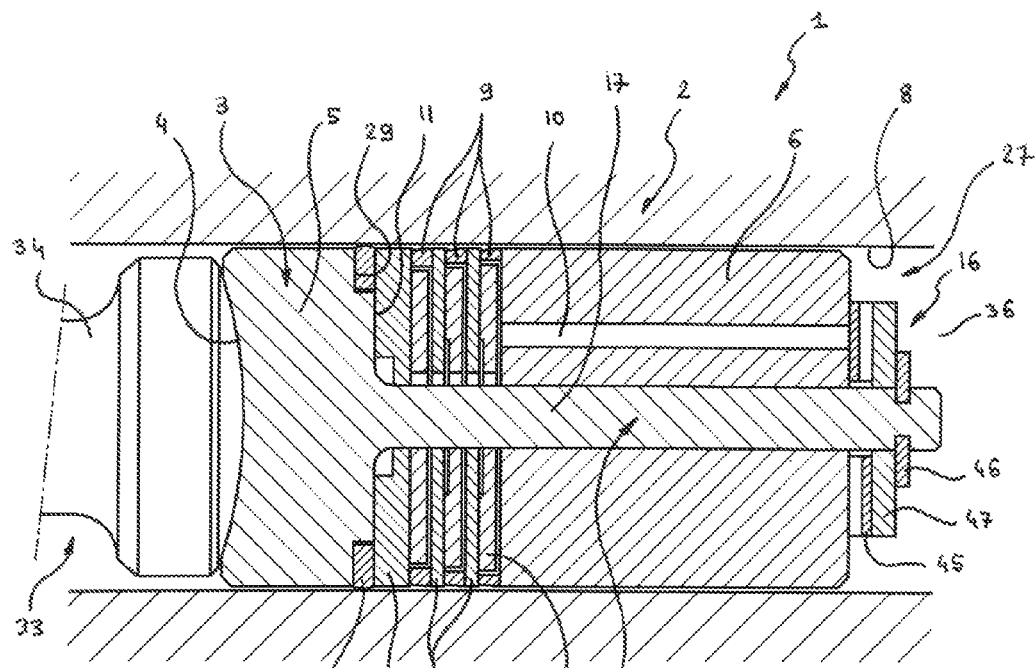
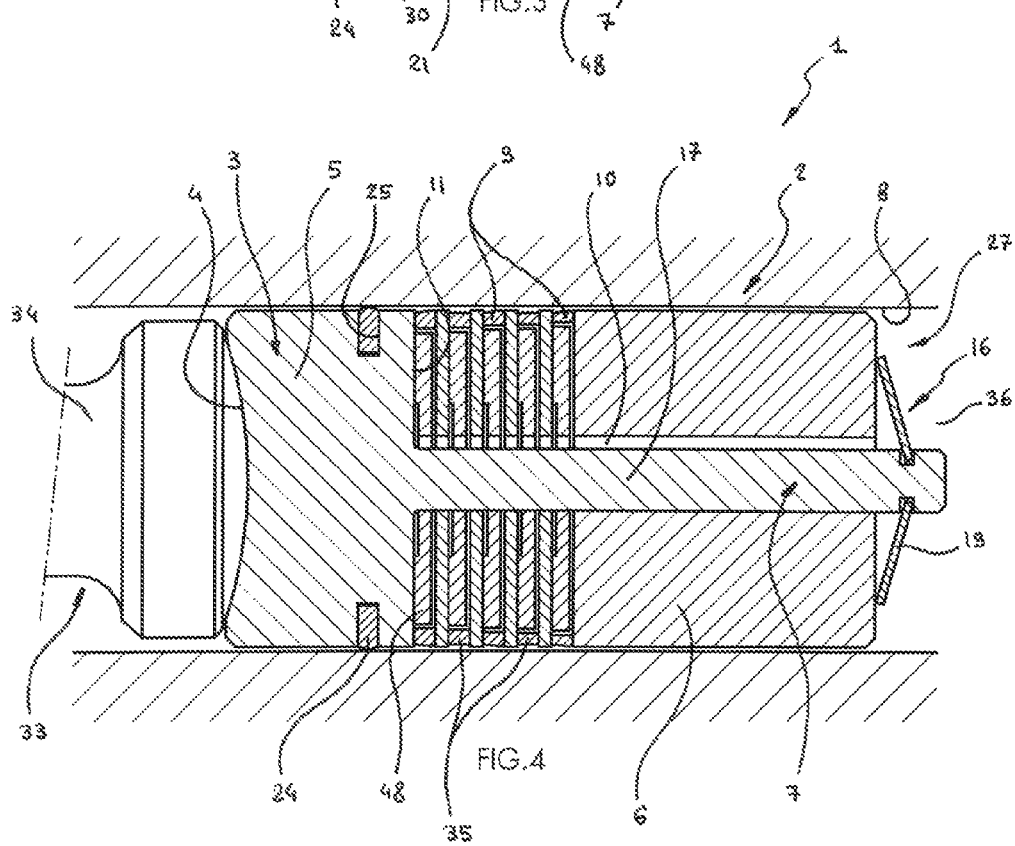

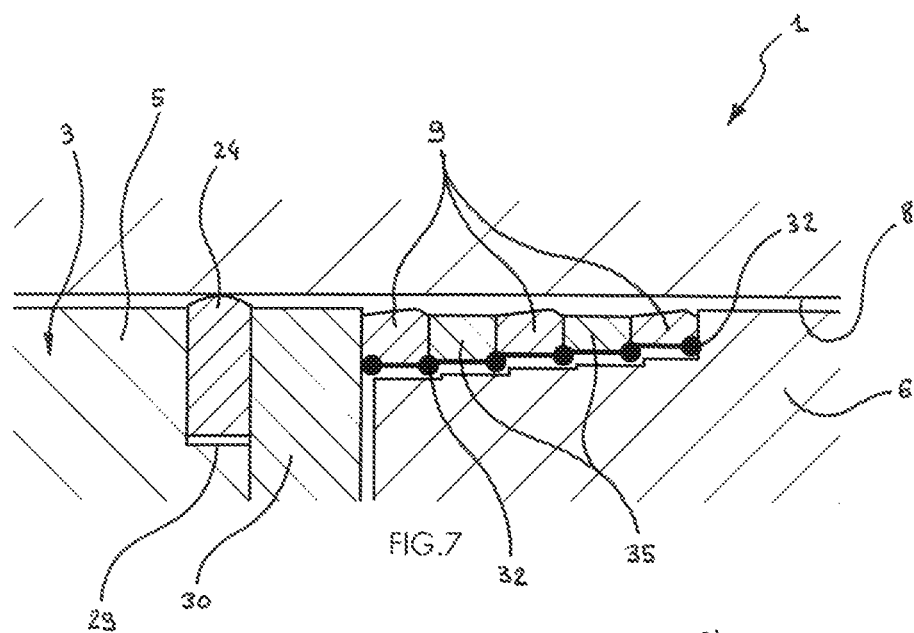
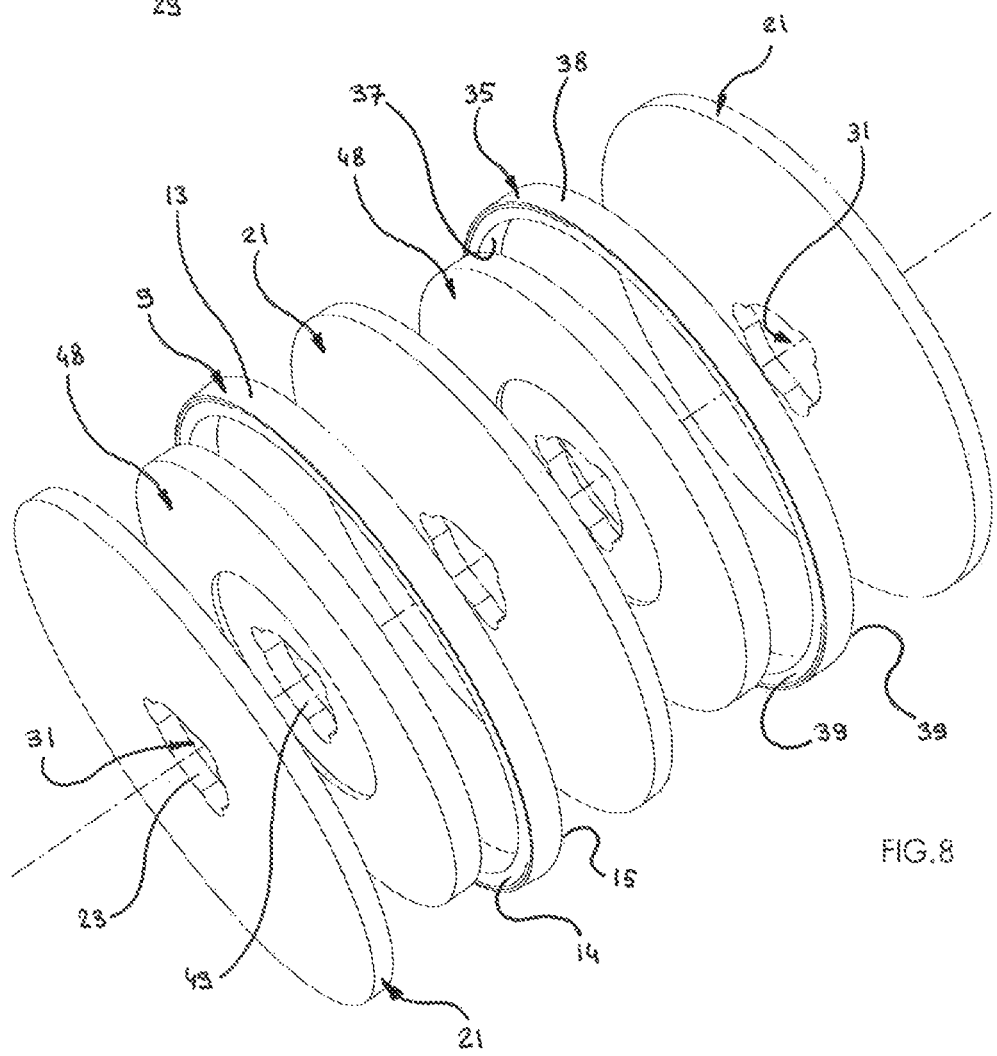

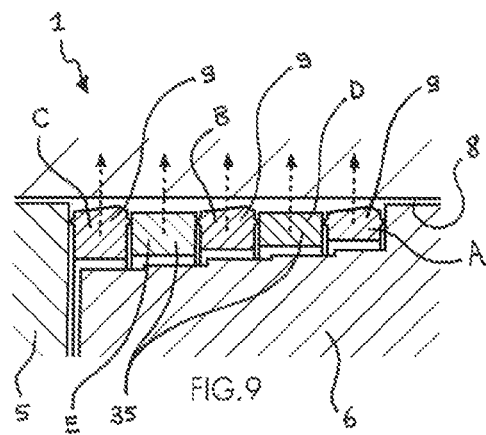
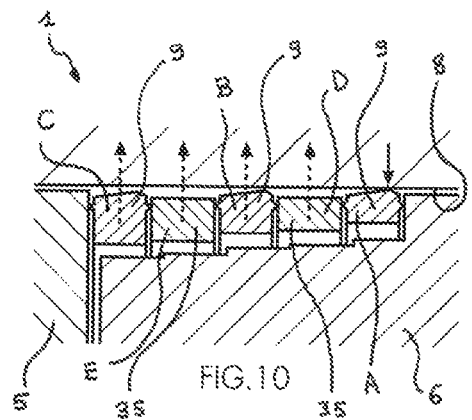
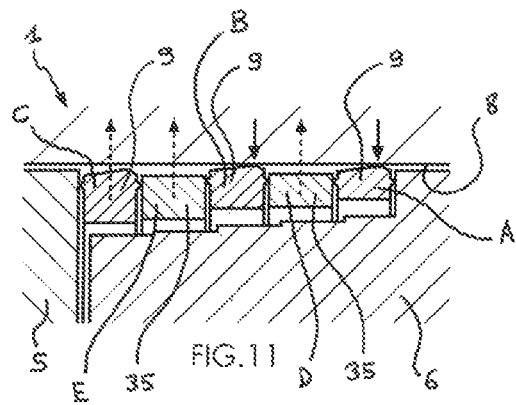
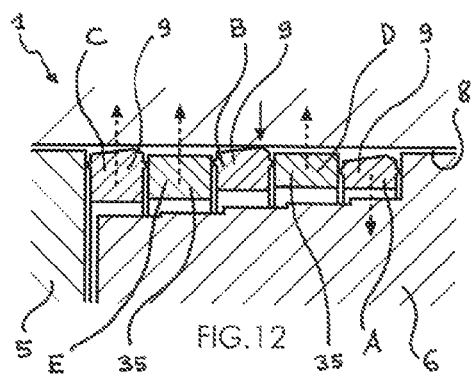
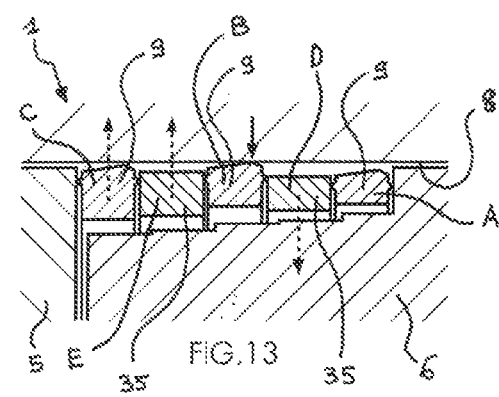
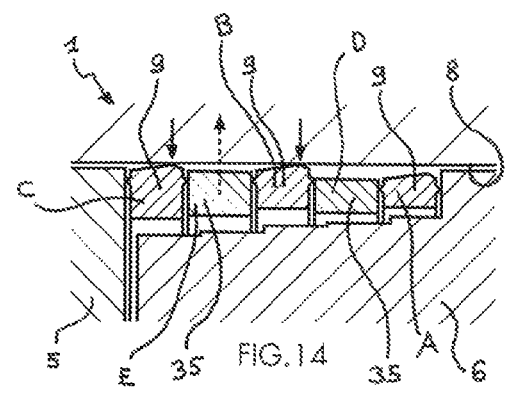
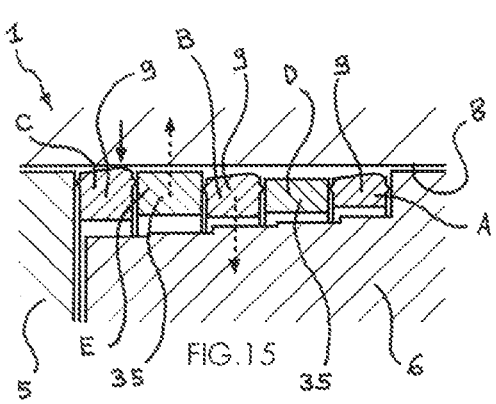
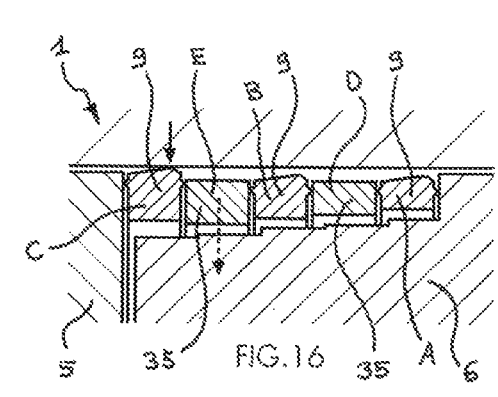

SEALING DEVICE FOR A PISTON

The present invention relates to a sealing device for a piston, particularly adapted to any piston operating under high pressure.

Pistons are used in numerous machines in particular to compress a gas, to pump a liquid, to bring together the work resulting from the expansion of a gas, or to transform a flow of liquid under pressure into mechanical work.

It is difficult to find an acceptable compromise between the sealing of the pistons and the losses by friction which are generated by means used in order to obtain said sealing. In fact, the final energy balance of sealing devices for pistons results principally from the sum of energy losses due to the leaks which cannot be contained and the friction which they generate.

The most demanding applications which make it necessary to have pistons sealed as tightly as possible while generating the lowest possible losses by friction include high-pressure or even very high-pressure oil pumps, with axial or radial pistons, and in particular those intended for hydraulic transmission systems.

In order to achieve sealing, a method consists of providing a small clearance between the piston and its cylinder. Said clearance is obtained by the precision of machining. This approach is effective at pressures of several tens to several hundreds of bars; however, under very high pressures, for example one thousand five hundred or two thousand bars, said approach leads to elevated oil leakage rates when it is subjected to said very high pressures, and the diameter of the cylinder in which the piston is housed is increased so that the nominal clearance between said cylinder and said piston increases significantly.

An alternative consists of providing a seal housed in a groove arranged on the periphery of the piston. Nevertheless, under the very high pressures previously mentioned, said seal is deformed in its groove, exerts a high pressure on the cylinder, and generates high losses by friction which impairs the final output of the oil pump that is equipped therewith. In addition, as the diameter of the cylinder increases with the pressure, said seal should ensure the required sealing in a larger clearance between said piston and said cylinder, which tends to extrude said seal under the effect of the pressure and to lead to the destruction of said seal.

Another approach consists of providing for the oil pump a piston of which all or part of the body has a rigidity such that the pressure subjects said body to a deformation comparable to that to which it subjects the cylinder in which said piston moves. This approach makes it possible to retain a small clearance between said piston and said cylinder and has for example been adopted by the company "INNAS" in order to produce its "floating cup" hydraulic pump. Nevertheless, said approach has the drawback that it only functions with a cylinder which has a rigidity substantially comparable to that of the body of the piston which—in the range of high pressures—leads to excessive restrictions in the material of said cylinder and of said piston.

It will be noted that the cup segments are unsuitable for pistons operating under very high pressure since the oil leakage rates in the region of said cup are excessive. Furthermore, said cup is larger as the diameter of the cylinder increases under the effect of said pressure. This reduces the volumetric efficiency of the oil pump which is equipped therewith. In addition, the pressure exerted by said segment on the wall of said cylinder is greater as said pressure rises. This latter effect increases the losses by friction in the region of the contact between said segment and said cylinder, which reduces the mechanical efficiency of said oil pump.

In particular in order to solve these different problems associated with pistons in general and with pistons of high-pressure oil pumps in particular, the sealing device for a piston according to the invention makes it possible, depending upon the embodiment employed:

to achieve, in a robust and durable manner, a high degree of sealing between any piston and the cylinder with which it co-operates, including cases where said piston is to contain a fluid placed under a very great pressure up to two thousand bars and more, and in spite of the considerable deformation to which said pressure subjects said cylinder;

to generate small or moderate losses by friction, regardless of the pressure which the fluid exerts on said piston and on the cylinder with which said piston co-operates.

Furthermore, the sealing device for a piston according to the invention is provided in order to have a moderate cost price in manufacture, and does not use any complex implementation processes or expensive material.

It is understood that, in addition to its application to the radial or axial pistons of oil pumps known to the person skilled in the art, the sealing device for a piston according to the invention may be applied to any machine or apparatus comprising at least one piston, that said machine or said apparatus is—without being limited thereto—a pump, an engine or a jack, or that it is for example a pressure distributor or booster. The sealing device according to the invention may also be applied to any piston of any type whatsoever which produces sealing with a cylinder or with any other recessed shape of complementary shape to said piston and which contains a gas, a liquid or a semi-solid element.

The other characteristics of the present invention have been described in the description and in the subordinate claims which are directly or indirectly dependent upon the main claim.

The sealing device for a piston according to the present invention is provided for a piston moving in a cylinder of which one of the ends at least is closed by a fluid chamber, said piston comprising at least one piston head which includes at least one fixed skirt and has, on the one hand, a piston support face in order to exert a force on any mechanical, hydraulic or pneumatic transmission means and, on the other hand, a compression face which emerges in the fluid chamber and which can receive the pressure of a fluid, said device comprising:

at least one sliding skirt of cylindrical shape housed in the cylinder with a small clearance, placed in the extension of the piston head on the side of the compression face and in the axis of said head, said sliding skirt being connected to said head by a mechanical inter-skirt connection which enables it to move in longitudinal translation with respect to said head;

at least one pressure transmission channel arranged inside the sliding skirt and passing right through this latter in the axial direction;

at least one extensible continuous segment of continuous annular form, interposed between the fixed skirt and the sliding skirt, and comprising an internal cylindrical segment face subjected to the pressure of the fluid via the pressure transmission channel, an external cylindrical segment face capable of coming into contact with the cylinder, an axial segment face on the side of the fixed skirt held directly or indirectly in sealed contact with the fixed skirt and an axial segment face on the side of the sliding skirt held directly or indirectly in sealed contact with the sliding skirt;

at least one sliding skirt spring which tends to bring the sliding skirt closer to the fixed skirt, and to axially compress the extensible continuous segment.

The sealing device for a piston according to the present invention comprises a mechanical inter-skirt connection which consists of a mandrel integral with the compression face and which co-operates with a mandrel orifice arranged axially in the sliding skirt, said mandrel being housed in said orifice.

The sealing device for a piston according to the present invention comprises a sliding skirt spring which is a resilient washer supported on the one hand on the end of the mandrel, and on the other hand on the sliding skirt.

The sealing device for a piston according to the present invention comprises at least one floating plate with an external diameter substantially smaller than the internal diameter of the cylinder which is directly or indirectly interposed between the extensible continuous segment and the fixed skirt or between said segment and the sliding skirt, the axial segment face on the side of the fixed skirt and/or the axial segment face on the side of the sliding skirt being kept in sealed contact with said plate whilst this latter is traversed by at least one axial plate orifice enabling the mechanical inter-skirt connection to pass through said plate.

The sealing device for a piston according to the present invention comprises a floating plate which includes plate centering means which can be seen in particular in FIG. 8 and which tend to center radially said plate with respect to the sliding skirt or with respect to the fixed skirt, said means being supported directly or indirectly on one or the other of said skirts or on the mechanical inter-skirt connection.

The sealing device for a piston according to the present invention comprises a floating plate which includes a segment groove which co-operates for radial centering of the extensible continuous segment with respect to the sliding skirt or with respect to the fixed skirt.

The sealing device for a piston according to the present invention comprises a fixed skirt which includes at least one scraper segment housed in a scraper groove arranged on the external cylindrical surface of said skirt.

The sealing device for a piston according to the present invention comprises an external cylindrical segment face which includes at least one axial micro-leakage groove.

The sealing device for a piston according to the present invention comprises an internal cylindrical segment face which co-operates with at least one circular sealing joint made of flexible material in order to directly or indirectly produce a seal with the fixed skirt and/or the sliding skirt.

The sealing device for a piston according to the present invention comprises an axial portion of the length of the internal cylindrical segment face which is closest to the fixed skirt which on average has a larger diameter than the axial portion of the length of said internal cylindrical face which is closest to the sliding skirt in such a way that the extensible continuous segment is, over all of its axial length, radially less thick and less rigid on the side of the fixed skirt than on the side of the sliding skirt, whilst the external cylindrical segment face for its part remains approximately of the same diameter over all the axial length of said segment.

The sealing device for a piston according to the present invention comprises at least one extensible continuous unlocking segment of continuous annular form of which the external diameter is substantially smaller than the internal diameter of the cylinder and which is directly or indirectly interposed between two extensible continuous segments, said extensible continuous unlocking segment comprising an internal cylindrical unlocking segment face subjected to the pressure of the fluid via the pressure transmission channel, an external cylindrical unlocking segment face which can bring closer together the cylinder and two axial unlocking segment faces each kept directly or indirectly in sealed contact with one of the two extensible continuous segments.

The sealing device for a piston according to the present invention comprises a sliding skirt which has extensible continuous segment centering means which co-operate with the internal cylindrical segment face in order to center the extensible continuous segment with respect to said skirt and/or unlocking segment centering means which co-operate with the internal cylindrical unlocking segment face in order to center the extensible continuous unlocking segment with respect to said skirt.

The sealing device for a piston according to the present invention comprises an extensible continuous segment and/or an extensible continuous unlocking segment which is (are) kept approximately centered with respect to the sliding skirt by a centering ring which is itself centered with respect to said skirt by centering ring centering means.

The following description with regard to the appended drawings by way of non-limiting examples will enable a good understanding of the invention, the characteristics which it presents, and the advantages which it can provide:

FIG. 1 shows a three-dimensional view of the sealing device for a piston according to the invention.

FIG. 2 shows an exploded three-dimensional view of the sealing device for a piston according to the invention.

FIG. 3 shows a schematic sectional view of the sealing device for a piston according to the invention comprising three extensible continuous segments separated from one another by a floating plate, each said segment being kept approximately centered with respect to the sliding skirt by a centering ring.

FIG. 4 shows a schematic sectional view of the sealing device for a piston according to the invention comprising three extensible continuous segments and two extensible unlocking continuous segments, said segments being separated from one another by a floating plate and being kept approximately centered with respect to the sliding skirt by a centering ring.

FIG. 7 shows a schematic partial sectional view of the sealing device for a piston according to the invention which shows three extensible continuous segments between which an extensible unlocking continuous segment is interposed, said segments being sealed relative to one another on the one hand and to the fixed skirt and the sliding skirt on the other hand by a circular sealing joint.

FIG. 8 shows a three-dimensional exploded view of an extensible continuous segment and an extensible continuous unlocking segment such as may be included in the sealing device for a piston according to the invention, as well as floating plates and centering rings with which said segments co-operate.

FIGS. 9 to 16 show schematic partial sectional views illustrating the operation of the sealing device for a piston according to the invention when it comprises three extensible continuous segments between which an extensible unlocking continuous segment is interposed.

DESCRIPTION OF THE INVENTION

Figure 5:
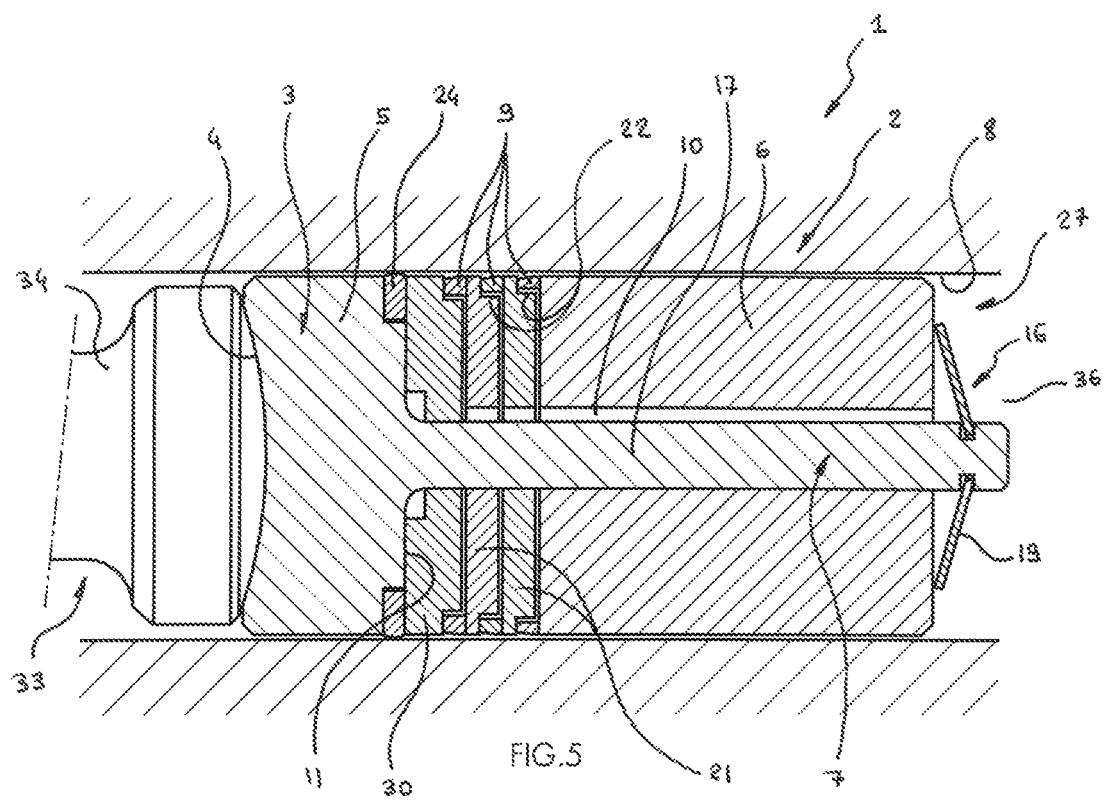
FIG. 5 shows a schematic sectional view of the sealing device for a piston according to the invention comprising three extensible continuous segments separated from one another by a floating plate of which the segment groove ensures the centering of said segments with respect to the sliding skirt.

FIGS. 1 to 17 show the sealing device for a piston 1, various details of the components thereof, variants thereof, and accessories thereof.

The sealing device for a piston 1 is provided for a piston 2 moving in a cylinder 8 of which one of the ends at least is closed by a fluid chamber 27, said piston 2 comprising at least one piston head 3 which includes at least one fixed skirt 5 and has, on the one hand, a piston support face 4 in order to exert a force on any mechanical, hydraulic or pneumatic transmission means 33 and, on the other hand, a compression face 11 which emerges in the fluid chamber 27 and which can receive the pressure of a fluid 36.

It may be noted that the transmission means 33 may for example be a strut 34 such as that shown in FIGS. 1 to 6.

It may be seen, particularly in FIGS. 3 to 6, that the sealing device for a piston 1 comprises at least one sliding skirt 6 of cylindrical shape housed in the cylinder 8 with a small clearance, placed in the extension of the piston head 3 on the side of the compression face 11 and in the axis of said head 3, said sliding skirt 6 being connected to said head 3 by a mechanical inter-skirt connection 7 which enables it to move in longitudinal translation with respect to said head 3, said mechanical connection 7 defining with said skirt 6 a slide connection, a sliding pivot connection, a sliding ball joint connection or any other type of connection, whilst the small clearance left between said skirt 6 and the cylinder 8 constitutes a seal.

The sealing device for a piston 1 also comprises at least one pressure transmission channel 10 arranged inside the sliding skirt 6 and passing right through this latter in the axial direction.

Said device 1 also comprises at least one extensible continuous segment 9 of continuous annular form, interposed between the fixed skirt 5 and the sliding skirt 6, and comprising an internal cylindrical segment face 12 subjected to the pressure of the fluid 36 via the pressure transmission channel 10, an external cylindrical segment face 13 capable of coming into contact with the cylinder 8, an axial segment face on the side of the fixed skirt 14 held directly or indirectly in sealed contact with the fixed skirt 5 and an axial segment face on the side of the sliding skirt 15 held directly or indirectly in sealed contact with the sliding skirt 6, wherein said segment 9 does not include any cup whilst when the pressure in the fluid chamber 27 is zero, said segment 9 leaves a diametral clearance with the cylinder 8 and has a radial thickness such that, above a certain pressure exerted by the fluid 36 on the internal cylindrical segment face 12 via the pressure transmission channel 10, the external cylindrical segment face 13 comes into contact with the cylinder 8 over all of the circumference thereof.

Figure 17:
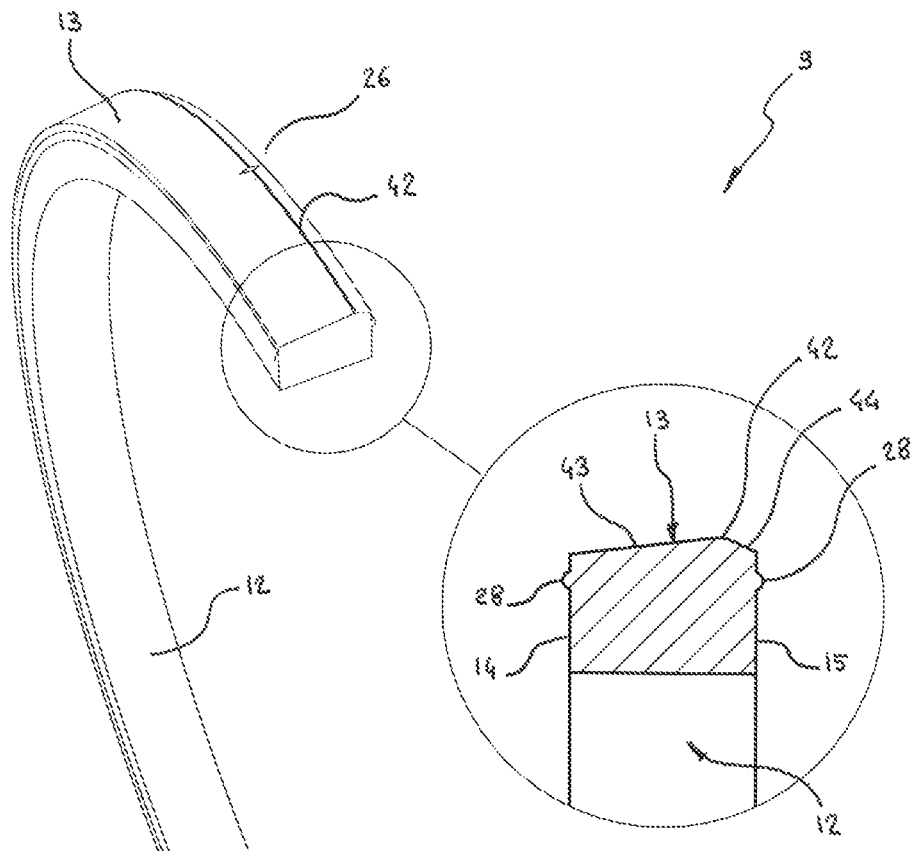
FIG. 17 shows a cut-away three-dimensional view of an extensible continuous segment such as may be provided for the sealing device for a piston according to the invention, said view including a schematic cross-section showing the cross-section of said segment in greater detail.

It may be noted that, according to an alternative embodiment of the device 1 according to the invention clearly illustrated in FIG. 17, a contact line 42 can be arranged protruding on the external cylindrical segment face 13. Said line 42 may be substantially eccentric on the axial length of the extensible continuous segment 9 in the direction of the sliding skirt 6 in such a way that on the side of said line 42 oriented in the direction of the fixed skirt 5 a long gradient of low inclination 43 is formed, whilst on the side of said line 42 oriented in the direction of the sliding skirt 6 a short gradient of steep inclination 44 is formed.

It is specified that the extensible continuous segment 9, the sliding skirt 6 or the fixed skirt 5 can be nitrided, cemented and/or coated with DLC (diamond-like carbon) or any other coating which is hard and/or has a low coefficient of friction. It may be noted that the external cylindrical segment face 13 may have a profile with a crown, with a simple gradient, with a double gradient, with a shoulder, with a complex shape or with any geometry applicable to the segments in general and enabling control of the contact pressure between said face 13 and the cylinder 8, the thickness of the oil film formed between said face 13 and said cylinder 8, or the twisting, tilting or flexing movements of the extensible continuous segment 9.

Furthermore, the profile of the external cylindrical segment face 13 may be bevelled in order to enable the extensible continuous segment 9 to retract quickly under the effect of a balancing of the pressures to which said face 13 is subjected on either side of its line of contact with the cylinder 8. It will also be noted that the axial segment face on the side of the fixed skirt 14 and/or the axial segment face on the side of the sliding skirt 15 and/or the fixed skirt 5 and/or the sliding skirt 6 can have an axial annular protrusion 28 which makes it possible to reduce the contact surface between said faces 14, 15 and said skirts 5, 6 in order to guarantee the best possible sealing between said faces 14, 15 and said skirts 5, 6.

The same applies if said faces 14, 15 are in contact with an extensible continuous unlocking segment 35 or a floating plate 21, wherein this latter may likewise include—according to a particular embodiment of the sealing device according to the invention—an axial annular protrusion 28.

As illustrated in FIGS. 2 to 6, the sealing device for a piston 1 comprises at least one sliding skirt spring 16 which tends to bring the sliding skirt 6 closer to the fixed skirt 5, and to compress the extensible continuous segment 9 axially, wherein said spring 16 may be a Belleville washer, a resilient washer of any type, or may be a helical washer, a blade washer, a torsion washer, a traction washer, a compression washer, or any type known to the person skilled in the art.

According to a variant of the sealing device for a piston 1 according to the invention illustrated in FIGS. 2 to 6, the mechanical inter-skirt connection 7 can consist of a mandrel 17 integral with the compression face 11 and co-operating with a mandrel orifice 18 arranged axially in the sliding skirt 6, wherein said mandrel 17 is housed in said orifice 18 and may have a cross-section which is circular or of any other possible geometry, a sufficient clearance is left between said mandrel 17 and the mandrel orifice 18 which leaves a space constituting the pressure transmission channel 10, and this latter can likewise take the form of at least one longitudinal groove arranged in the mandrel orifice 18 and/or on the mandrel 17.

Figure 6:
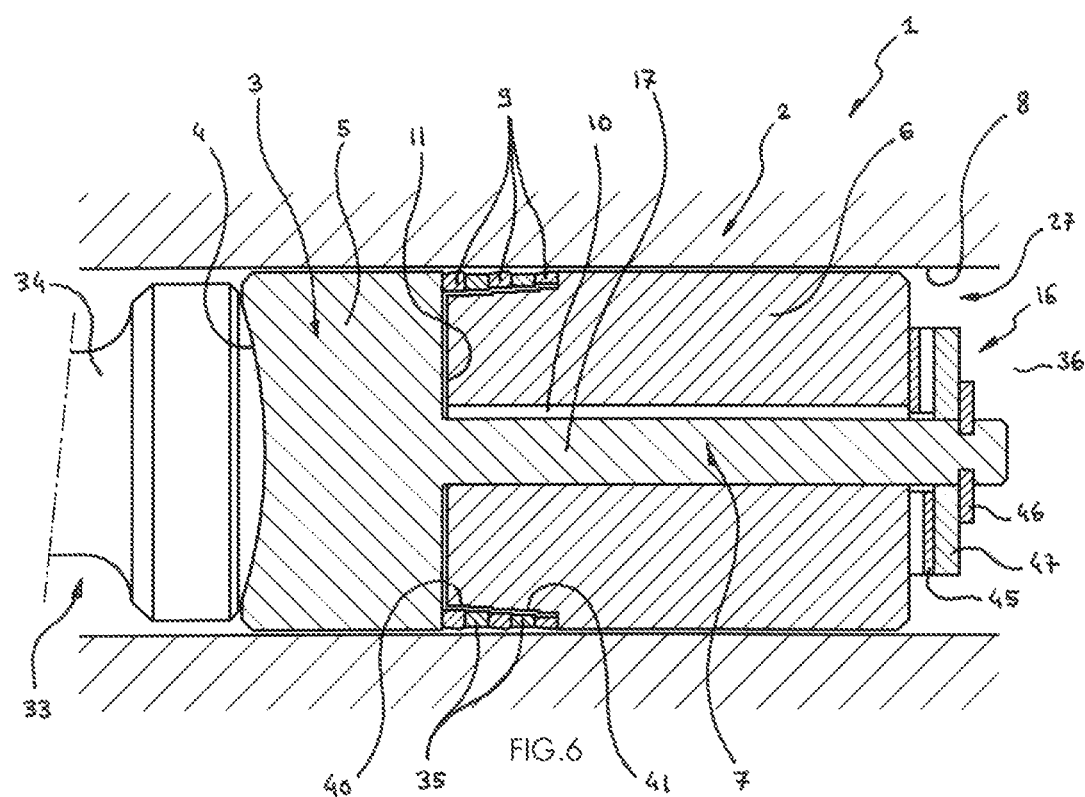
FIG. 6 shows a schematic sectional view of the sealing device for a piston according to the invention comprising three extensible continuous segments between which an extensible unlocking continuous segment is interposed whilst the sliding skirt has extensible continuous segment centering means and unlocking segment centering means.

It may be noted that the sliding skirt spring 16 can be a resilient washer 19 supported on the one hand on the end of the mandrel 17, and on the other hand on the sliding skirt 6, wherein said washer 19 can for example include a diaphragm such as is shown in FIGS. 2, 4 and 5 of which the central part is partially housed in a stop groove 20 arranged at the end of the mandrel 17, and said washer 19 can also be—according to another alternative embodiment shown in FIGS. 3 and 6—a wavy spring washer 45 co-operating with a circlip 46 housed in said groove 20, and a flat washer 47 can in this case be interposed between said circlip 46 and said wavy spring washer 45.

FIGS. 2 to 5 and 7 to 16 show that the sealing device for a piston 1 can also include at least one floating plate 21 with an external diameter substantially smaller than the internal diameter of the cylinder 8 and directly or indirectly interposed between the extensible continuous segment 9 and the fixed skirt 5 or between said segment 9 and the sliding skirt 6, the axial segment face on the side of the fixed skirt 14 and/or the axial segment face on the side of the sliding skirt 15 being kept in sealed contact with said plate 21 whilst this latter is traversed by at least one axial plate orifice 31 enabling the mechanical inter-skirt connection 7 to pass through said plate 21.

It may be noted that the floating plate 21 may be interposed between two extensible continuous segments 9, or between an extensible continuous segment 9 and an extensible continuous unlocking segment 35. Moreover the floating plate 21 can be nitrided, cemented and/or coated with DLC (diamond-like carbon) or any other coating which is hard and/or has a low coefficient of friction.

By way of a variant, the floating plate 21 can include plate centering means 23 which can be seen in particular in FIG. 8 and which tend to radially center said plate 21 with respect to the sliding skirt 6 or with respect to the fixed skirt 5, said means 23 being supported directly or indirectly on one or the other of said skirts 5, 6 or on the mechanical inter-skirt connection 7 or else on another floating plate 21.

As shown in FIG. 5, the floating plate 21 may also include a segment groove 22 which co-operates in the radial centering of the extensible continuous segment 9 with respect to the sliding skirt 6 or with respect to the fixed skirt 5.

It may be noted that the floating plate 21 can also include an axial channel which allows the fluid 36 to pass from one face to the other of said plate 21 and/or another radial channel, groove or bore which allows the fluid 36 to pass from the center towards the periphery of said plate 21.

As can be seen in FIGS. 1 to 5 and in FIG. 7, the fixed skirt 5 of the sealing device for a piston 1 can include at least one scraper segment 24 housed in a scraper groove 25 arranged on the external cylindrical surface of said skirt 5, said segment 24 remaining permanently in contact with the internal wall of the cylinder 8 in such a way as to always keep oil stored between the fixed skirt 5 and the sliding skirt 6 whilst it may be made of flexible material such as rubber or elastomer which may or may not include anti-friction and/or anti-wear material, may be a simple or composite joint, or may be a metal ring including a cup.

In this latter case it may be noted that the scraper segment 24 can be nitrided, cemented and/or coated with DLC (diamond-like carbon) or any other coating which is hard and/or has a low coefficient of friction. It may be noted that said segment 24 may include a profile with a crown, a profile which is conical or has any geometry applicable to the segments in general and enabling control of the contact pressure exerted by said segment 24 on said cylinder 8, or the thickness of the oil film formed between said segment 24 and said cylinder 8, or also the twisting, tilting or flexing movements of said segment 24.

It will be noted in FIGS. 3, 5 and 7 that the scraper groove 25 can advantageously be constituted by a bore 29 produced on the axial periphery of the fixed skirt 5, said bore 29 co-operating with a bore washer 30, this configuration making it possible to mount the scraper segment 24 on a piston 2 of very small diameter.

According to a variant shown in FIG. 17, the external cylindrical segment face 13 may include at least one axial micro-leakage groove 26 which makes it possible for a very small quantity of oil under pressure to pass between the extensible continuous segment 9 and the cylinder 8 when the external cylindrical segment face 13 is in contact with said cylinder 8.

It will be noted in FIG. 7 that the internal cylindrical segment face 12 can co-operate with at least one circular sealing joint 32 made of flexible material in order directly or indirectly to produce a seal with the fixed skirt 5 and/or the sliding skirt 6, wherein said joint 32 may have a cross-section which is round, square, polygonal, complex, or of any geometry achievable by the person skilled in the art, whilst said seal may be produced by said joint 32 directly between the internal cylindrical segment face 12 and the fixed skirt 5 and/or the sliding skirt 6, or indirectly by simultaneously producing a seal with at least one floating plate 21 and/or an extensible continuous unlocking segment 35 interposed between said face 21 and said skirts 5, 6.

According to a variant of the sealing device for a piston 1 according to the invention, the axial portion of the length of the internal cylindrical segment face 12 which is closest to the fixed skirt 5 can on average have a larger diameter than the axial portion of the length of said internal cylindrical face 12 which is closest to the sliding skirt 6 in such a way that the extensible continuous segment 9 is, over all of its axial length, radially less thick and less rigid on the side of the fixed skirt 5 than on the side of the sliding skirt 6, whilst the external cylindrical segment face 13 for its part remains approximately of the same diameter over all the axial length of said segment 9.

It will be understood that this particular geometry makes it possible in particular for the extensible continuous segment 9 to drive—like a pump—a little oil or any other fluid 36 under pressure in the direction of the sliding skirt 6 during the increase in pressure of the fluid chamber 27.

It may be noted that this arrangement applies if said segment 9 is required to produce the seal between the piston 2 and the cylinder 8 at intermediate pressure and for this purpose is positioned between, on the one hand, an extensible continuous segment 9 placed closest to the sliding skirt 6 in order to produce said seal at the lowest pressure, and on the other hand, another extensible continuous segment 9 placed closest to the fixed skirt 5 in order to produce said seal at the highest pressure. Thus said segment 9 operating at intermediate pressure makes it possible—by the pump effect which it produces after coming into contact with the cylinder 8 whilst the pressure in the fluid chamber 27 continues to rise—that the immediately adjacent extensible continuous segment 9, operating at a lower pressure and placed nearer the sliding skirt 6, retracts during said increase in pressure of the fluid chamber 27. This effect of retraction is necessary in order to limit the friction generated by the sealing device for a piston 1 according to the invention.

As illustrated in FIGS. 2 and 4 and in FIGS. 6 to 16, the sealing device for a piston 1 according to the invention may include at least one extensible continuous unlocking segment 35 of continuous annular form including the diameter external is substantially lower to the diameter interior of the cylinder 8 and which is directly or indirectly interposed between two segment continuous extensible 9, said extensible continuous unlocking segment 35 comprising an internal cylindrical unlocking segment face 37 subjected to the pressure of the fluid 36 via the pressure transmission channel 10, an external cylindrical unlocking segment face 38 which can bring closer together the cylinder 8 and two axial unlocking segment faces 39 each kept directly or indirectly in sealed contact with one of the two extensible continuous segments 9.

It may be noted that said unlocking segment 37 does not includes any cup and leaves a diametral clearance with the cylinder 8 and has a radial thickness such that from the moment when the extensible continuous segment 9 which is in sealed contact with said unlocking segment 37 and which is closest to the fixed skirt 5 comes into contact with the cylinder 8, there is still a certain distance between the external cylindrical unlocking segment face 38 of said unlocking segment 37 and said cylinder 8. Once this latter contact is established and as the pressure continues to increase in the fluid chamber 27, the diameter of the external cylindrical unlocking segment face 38 continues to increase, which increases the pressure of the fluid 36 comprised between said face 38, the two said extensible continuous segments 9 and the cylinder 8, which tends to balance the pressures to which the external cylindrical segment face 13 is subjected on either side of its line of contact with the cylinder 8 of the extensible continuous segment 9 which is in sealed contact with said unlocking segment 37 and which is closest to the sliding skirt 6.

As a result this latter extensible continuous segment 9 can retract quickly in such a way that it passes the responsibility for ensuring the seal between the piston 2 and the cylinder 8 to the extensible continuous segment 9 which is in sealed contact with said unlocking segment 37 and which is closest to the fixed skirt 5. It may be noted that the extensible continuous unlocking segment 35 can be nitrided, cemented and/or coated with DLC (diamond-like carbon) or any other coating which is hard and/or has a low coefficient of friction.

Furthermore, the axial unlocking segment faces 39 can include an axial annular protrusion 28 which reduces the contact surface and increases the contact pressure between said faces 39 and the extensible continuous segments 9 or between said faces 39 and the floating plates 21. Said protrusion 28 reinforces the seal of the sealing device for a piston 1 according to the invention.

It may be seen, particularly in FIG. 6, that the sliding skirt 6 can—as a variant—have extensible continuous segment centering means 40 which co-operate with the internal cylindrical segment face 12 in order to center the extensible continuous segment 9 with respect to said skirt 6 and/or unlocking segment centering means 41 which co-operate with the internal cylindrical unlocking segment face 37 in order to center the extensible continuous unlocking segment 35 with respect to said skirt 6.

According to another variant of the sealing device for a piston 1 represented in FIGS. 2 to 4 and in FIG. 8, the extensible continuous segment 9 and/or the extensible continuous unlocking segment 35 can be kept approximately centered with respect to the sliding skirt 6 by a centering ring which is itself centered with respect to said skirt 6 by centering ring centering means 49 which can co-operate—for example—with the mandrel 17.

It may be noted that the centering ring 49 is traversed by at least one axial orifice which enables the mechanical inter-skirt connection to traverse said ring 49, whilst this latter can also include an axial channel which allows the fluid 36 to pass from one face to the other of said ring 49 and/or another radial channel, groove or bore which allows the fluid 36 to pass from the center towards the periphery of said plate 49.

Operation of the Invention

The operation of the sealing device for a piston 1 will be understood by considering FIGS. 9 to 16 on which, as a non-limiting alternative embodiment, said device 1 is shown provided with three extensible continuous segments 9 interposed between the fixed skirt 5 and the sliding skirt 6, whilst an extensible continuous unlocking segment 35 is interposed between each segment 9.

According to this embodiment of said device 1 according to the invention, the fluid chamber 27 is filled with fluid 36 of which the pressure is variable, said fluid 36 being oil. It will be noted that under the effect of the pressure of said oil, the piston 2 can push on mechanical transmission means 33, these latter taking the form—according to the non-limiting example disclosed in FIGS. 1 to 6—of a strut 34.

In order to facilitate the understanding of the operation of the sealing device 1, mention will be made here of the first extensible continuous segment 9 starting from the sliding skirt 6 "low-pressure segment A", the second "medium-pressure segment B", and the third "high-pressure segment C". This latter segment C is therefore the one positioned closest to the fixed skirt 5.

Likewise, mention will be made here of the extensible continuous unlocking segment 35 positioned between the low-pressure segment A and the medium-pressure segment B "low-pressure unlocking segment D", and mention will also be made of the extensible continuous unlocking segment 35 positioned between the medium-pressure segment B and the high-pressure segment C "medium-pressure unlocking segment E".

The sealing device 1 as represented in FIGS. 9 to 16 thus ensures the sealing of the piston 2 in the cylinder 8 according to four modes of operation, each of said modes corresponding to a range of pressure which can be exerted on the compression face 11 by the oil contained in the fluid chamber 27.

In order to simplify the description of the operation of the device 1 according to the invention, we consider in this case that—in accordance with the illustrations in FIGS. 9 to 16—only the extensible continuous segments 9 include axial annular protrusions 28, and that these latter all have the same contact diameter. We consider likewise that the external cylindrical segment face 13 of the low-pressure segment A, that of the medium-pressure segment B and that of the high-pressure segment C, have the same diameter when no particular oil pressure prevails in the fluid chamber 27.

Therefore the operation of the sealing device for a piston 1 according to the invention is as follows:

If a low pressure prevails in the fluid chamber 27 as shown on FIG. 9, it does not make use of any extensible continuous segment 9 in order to ensure the seal between the piston 2 and the cylinder 8 and in order to prevent the oil contained in said chamber 27 from escaping between said piston 2 and said cylinder 8. At this low level of pressure, said seal is achieved only by the small clearance existing between the sliding skirt 6 and said cylinder 8.

Low though it is, the pressure prevailing in the fluid chamber 27 is nevertheless immediately transmitted to the internal cylindrical segment face 12 of each of the three extensible continuous segments 9, and to the internal cylindrical unlocking segment face 37 of each of the two extensible continuous unlocking segments 35. Said pressure is transmitted to said faces 12, 37 via the pressure transmission channel 10 arranged inside the sliding skirt 6, said channel 10 passing right through said skirt 6 in the axial direction.

As illustrated in FIG. 9, the result of this is that the diameter of the external cylindrical segment face 13 of three extensible continuous segments 9 increases substantially, but not enough for said face 13 to come into contact with the cylinder 8. In a similar manner, the diameter of the external cylindrical unlocking segment face 28 of the two extensible continuous unlocking segments 35 increases substantially, whilst remaining at a certain distance from the wall of the cylinder 8.

It will be noted on FIGS. 9 to 16, but also for example on FIG. 6, that the oil contained in the fluid chamber 27 cannot escape—or only very little can escape—via the pressure transmission channel 10 then between the low-pressure segment A and the sliding skirt 6, between any extensible continuous segment 9 and the extensible continuous unlocking segment 35 with which it co-operates, and between the high-pressure segment C and the fixed skirt 5. In fact, these components are compressed with one another in the axial direction by, on the one hand, the sliding skirt spring 16 and by, on the other hand, the force which is produced by the pressure of the oil on the sliding skirt 6 and which tends to bring this latter closer to the fixed skirt 5. It may be noted that said force is approximately equal to the product of said pressure by the section of the diameter of the sliding skirt 6 minus the product of said pressure by the section of the contact diameter of the axial annular protrusion 28 of the low-pressure segment A. As disclosed previously, said protrusion ensures the seal between said sliding skirt 6 and said segment A.

It will be noted in FIGS. 9 to 16 that the average radial thickness of the low-pressure segment A is lower than that of the medium-pressure segment B, this latter being lower than that of the high-pressure segment C. Consequently, under the effect of the same oil pressure, the diameter of the external cylindrical segment face 13 of the low-pressure segment A increases more than that of said face 13 of the medium-pressure segment B, this latter increasing more than that of said face 13 of the high-pressure segment C.

According to the same principle, the average radial thickness of the low-pressure unlocking segment D is lower than that of the medium-pressure unlocking segment E. The result of this is that under the effect of the same oil pressure, the diameter of the external cylindrical unlocking segment face 28 of the low-pressure unlocking segment D increases more than that of the external cylindrical unlocking segment face 28 of the medium-pressure unlocking segment E.

As the pressure of the oil contained in the fluid chamber 27 continues to increase, the diameter of the external cylindrical segment face 13 of the three extensible continuous segments 9 continues to increase until this external cylindrical segment face 13 of the low-pressure segment A comes into circumferential contact with the cylinder 8 as shown on FIG. 10.

It may be noted that the contact pressure exerted by said face 13 on the cylinder 8 is in particular predetermined by the profile of said face 13 of the low-pressure segment A such as is particularly visible on FIG. 17, this profile being likewise applicable to the external cylindrical segment face 13 of the medium-pressure segments B and high-pressure segments C. Thus it is the pressure exerted by the oil on the internal cylindrical segment face 12 of said segment A combined with the rigidity and the profile of this latter which constitutes the required seal between said segment A and the cylinder 8.

As the pressure continues to increase in the fluid chamber 27, the diameter of the external cylindrical segment face 13 of the low-pressure segment A exerts an increasing pressure on the cylinder 8 whilst the diameter of the external cylindrical segment face 13 of the medium-pressure segment B and of the high-pressure segment C continues to increase until the external cylindrical segment face 13 of the medium-pressure segment B comes into circumferential contact with the cylinder 8 as shown on FIG. 11. At this stage, the oil pressure remains insufficient for the external cylindrical segment face 13 of the high-pressure segment C to come into circumferential contact with the cylinder 8 since the radial thickness of said high-pressure segment C is greater than that of the medium-pressure segment B, as well as its rigidity.

Coming into circumferential contact with the cylinder 8, the medium-pressure segment B produces—by functioning as the low-pressure segment A—a seal between said medium-pressure segment B and said cylinder 8.

At this stage, the low-pressure segment A and the medium-pressure segment B are both in contact with the cylinder 8, whilst only the low-pressure segment A effectively stops the oil under pressure which could otherwise pass through between the piston 2 and the cylinder 8.

As the pressure continues to increase in the fluid chamber 27, the effective seal ensured by the low-pressure segment A can be transferred to the medium-pressure segment B by virtue of the action of the low-pressure unlocking segment D.

In fact, oil at very low pressure is confined in the small space left between the low-pressure segment A, the medium-pressure segment B, the external cylindrical unlocking segment face 38 of the low-pressure unlocking segment D, and the wall of the cylinder 8. This space is so small that a very small absolute reduction of its volume results in a substantial relative increase of the pressure of the oil which it contains.

As the pressure continues to increase in the fluid chamber 27, the diameter of the external cylindrical unlocking segment face 38 of the low-pressure unlocking segment D increases, said face 38 compressing the oil contained in said space. Said oil then exerts an increasing pressure on the external cylindrical segment face 13 of the low-pressure segment A, said pressure approaching the pressure exerted by the oil contained in the fluid chamber 27 via the pressure transmission channel 10 on the internal cylindrical segment face 12 of said low-pressure segment A.

Beyond a certain pressure in said space, the low-pressure segment A can no longer remain in contact with the cylinder 8 and retracts as shown on FIG. 12. In this case it no longer ensures the seal with the cylinder 8 and the pressure of the fluid chamber 27 propagates immediately to the space initially left between the low-pressure segment A, the medium-pressure segment B, the external cylindrical unlocking segment face 38 of the low-pressure unlocking segment D, and the wall of the cylinder 8. This has the effect of ending retraction of the low-pressure unlocking segment D, and likewise retraction of the low-pressure unlocking segment D as shown on FIG. 13.

At this stage, only the medium-pressure segment B therefore remains to ensure the essential seal between the piston 2 and the cylinder 8.

As the pressure in the fluid chamber 27 continues to increase, as shown on FIGS. 14 to 16, the same sequence of actions in the construction of a seal takes place between the medium-pressure segment B and the high-pressure segment C, the low-pressure unlocking segment D previously used being replaced in said sequence by the medium-pressure unlocking segment E.

It will be noted on FIGS. 1 to 5 and in FIG. 7 that a scraper segment 24 can be advantageously provided in a scraper groove 25 arranged on the external cylindrical surface of the fixed skirt 5 or in a bore 29 formed in the axial periphery of said skirt 5. This scraper segment 24 prevents the rapid reciprocating movements which the piston 2 may perform in the cylinder 8 from evacuating—by acceleration—the oil contained between the extensible continuous segments 9 and the cylinder 8 on the one hand, and between the extensible continuous unlocking segments 35 and said cylinder 8 on the other hand. In fact, the presence of said oil is necessary in order that any extensible continuous segment 9 which must retract in order to transfer the sealing for which it had hitherto been responsible to the neighboring extensible continuous segment 9 placed closer to the fixed skirt 5, can effectively do this. This retraction can only operate if—consecutively to the increase in pressure of the fluid chamber 27—the extensible continuous unlocking segment 35 positioned in direction of the fixed skirt 5 immediately after said segment 9 which must retract, can effectively compress the oil confined between its external cylindrical unlocking segment face 38 and the cylinder 8. This condition is necessary so that the pressure which the oil exerts on the external cylindrical segment face 13 of the extensible continuous segment 9 which must retract approaches the pressure exerted by said oil on the internal cylindrical segment face 12 of said segment 9, which causes the effective retraction of said segment 9 as required.

It may be noted that advantageously the sliding skirt 6 always allows a very small quantity of oil to escape between itself and the cylinder 8 each time that the pressure in the fluid chamber 27 becomes lower than the pressure where the low-pressure segment A comes into circumferential contact with the cylinder 8. Thus the sliding skirt 6 and the scraper segment 24 to always keep the oil between the extensible continuous segments 9 and the cylinder 8 on the one hand, and between the extensible continuous unlocking segments 35 and said cylinder 8 on the other hand.

It will be noted that a small clearance left between the fixed skirt 5 and the cylinder 8 may optionally render it unnecessary to use the scraper segment 24.

It may be noted that the sealing device for a piston 1 according to the invention operates so that the pressure prevailing in the fluid chamber 27 is rising or falling, each extensible continuous segment 9 coming into circumferential contact with the cylinder 8 in a predetermined pressure range.

It will be noted that in the rising pressure phase in the fluid chamber 27, over certain pressure ranges, one single extensible continuous segment 9 is in contact with the cylinder 8 whilst over other pressure ranges where an extensible continuous segment 9 transfers the seal for which it had hitherto been responsible to the neighboring extensible continuous segment 9 placed closer to the fixed skirt 5, these two latter extensible continuous segments 9 are temporarily in contact with the cylinder 8 simultaneously. This particular operation provided by the sealing device for a piston 1 according to the invention makes it possible to minimize any leakage of oil between the piston 2 and the cylinder 8.

FIG. 17 illustrates the profile of the external cylindrical segment faces 13 of the extensible continuous segments 9 as may be provided according to an alternative embodiment of the sealing device for a piston 1. Said profile defines a line of contact 42 which is arranged protruding on the external cylindrical segment face 13, and substantially eccentrically on the axial length of the extensible continuous segment 9 in the direction of the sliding skirt 6. The result of said profile is that on the side of said line 42 oriented in the direction of the fixed skirt 5 there is a long gradient of low inclination 43, whilst on the side of said line 42 oriented in the direction of the sliding skirt 6 there is a short gradient of steep inclination 44.

This non-limiting example of a profile of the external cylindrical segment face 13 ensures a sufficiently high contact pressure in the region of the line of contact 42, in order to achieve a good seal in spite of the fact that the force exerted on said line 42 remains low. In fact, said force results from the pressure exerted by the oil on the internal cylindrical segment face 12 over the length of the long gradient of low inclination 43, minus the force of retraction of the extensible continuous segment 9 due to its inherent rigidity.

The low force short exerted on the line of contact 42 generates low losses by friction at the interface between said line 42 and the cylinder 8. Nevertheless, the small width of contact of said line 42 results in a high contact pressure of said line 42 on the cylinder 8, said pressure providing a good seal.

It may be specified here that the height of the long gradient of low inclination 43 and of the short gradient of steep inclination 44 is in practice only several micrometers. In particular, the height of the long gradient of low inclination 43 is calculated so that there is a sufficient space between said gradient 43 and the cylinder 8 when the extensible continuous unlocking segment 35 which adjoins said gradient 43 compresses the oil between this latter and the cylinder 8, in order that the extensible continuous segment 9 on which said gradient 43 is arranged retracts as well as it should.

When reading the description of the operation of the sealing device for a piston 1 which has just been given, it will be readily deduced that no limit is fixed for the number of extensible continuous segments 9 and extensible continuous unlocking segments 35 which the piston 2 may include. It will also be understood that the losses by friction occurring between the piston 2 and the cylinder 8 are smaller as the number of extensible continuous segments 9 included by said piston 2 increases.

It may be recalled that at very low pressure, said device 1 does not generate significant friction between the extensible continuous segments 9 and the cylinder 8, the sealing being achieved in a satisfactory manner by the small clearance left between the sliding skirt 6 and the cylinder 8.

When the pressure of the oil for sealing rises in the fluid chamber 27, it may be noted that the friction between any extensible continuous segment 9 and the cylinder 8 remains limited since the force exerted by the external cylindrical segment face 13 of said segment 9 on said cylinder 8 under the effect of said pressure is reduced by the opposing force of retraction produced by said segment 9 due to its rigidity, this latter force opposing the increase of the diameter of said segment 9. Nevertheless, the circumferential contact pressure exerted by said face 13 on said cylinder 8 may remain sufficiently high to guarantee a good seal, said pressure being in particular predetermined by the profile of said face 13 as represented—by way of example—on FIG. 17.

Thus the sealing device for a piston 1 according to the invention makes it possible to preserve both moderate friction and a good seal even if the oil contained in the fluid chamber 27 is subjected to very high pressures, of the order of two thousand bars and more. In fact, the substantial variations of diameter of the cylinder 8 which results from such pressures do not prevent the operation of the device 1 according to the invention, nor its ability to ensure a good seal whilst generating low levels of friction. This originates from the fact that the radial thickness of each extensible continuous segment 9 is advantageously calculated taking account of the rigidity of the cylinder 8 in order that each said segment 9 comes into circumferential contact with said cylinder 8 on the basis of the required pressure, then generates the necessary contact pressure between its external cylindrical segment face 13 and said cylinder 8 in order to produce the required seal.

It may be noted that in general the sealing device for a piston 1 according to the invention requires high machining precision at least in order to produce the sliding skirt 6, the extensible continuous segments 9, the extensible continuous unlocking segments 35 and the cylinder 8, said precision being necessary in order to ensure a correct seal at low pressure and to minimize the clearance at rest between said segments 9, 35 and said cylinder 8.

Furthermore, if said device 1 is used in the context of very high pressures, the rigidity of the cylinder 8 should be sufficiently great in order that the extensible continuous segments 9 are not subjected to high fatigue stress under mechanical strains which are too great.

Thus it will be noted that the respective radial thickness of the extensible continuous segments 9 and extensible continuous unlocking segments 35 on the one hand, and the clearance left between said segments 9, 35 and the cylinder 8 on the other hand, are among the principal factors which determine the operation of the sealing device for a piston 1 according to the invention. The same applies to the radial rigidity of the cylinder 9 relative to that of said segments 9, 35. Furthermore, the axial positioning of the line of contact 42 on the external cylindrical segment face 13, as well as the width of contact of said line 42 on the cylinder 8 as a function of the pressure applied to the internal cylindrical segment face 12 of the segment comprising said line 42, substantially determine the operation of the device 1 according to the invention. In any case, the design and the dimensioning of said device 1 can advantageously use the finite-element method.

Also, the operating principle of the sealing device for a piston 1 according to the invention suggests extensible continuous segments 9 and extensible continuous unlocking segments 35 produced from materials with high strength, high mechanical resistance, and high resistance to fatigue.

The possibilities of the sealing device for a piston 1 according to the invention are not limited to the applications which have just been described and moreover it should be understood that the foregoing description has only been given by way of example and that it in no way limits the scope of said invention from which it would not depart by replacing the described details of execution by any other equivalent.

The invention claimed is:

1. Sealing device for a piston (1) provided for a piston (2) moving in a cylinder (8) of which one of the ends at least is closed by a fluid chamber (27), said piston (2) comprising at least one piston head (3) which includes at least one fixed skirt (5) and has, on the one hand, a piston support face (4) in order to exert a force on any mechanical, hydraulic or pneumatic transmission means (33) and, on the other hand, a compression face (11) which emerges in the fluid chamber (27) and which can receive the pressure of a fluid (36), characterized in that it comprises:

- at least one sliding skirt (6) of cylindrical shape housed in the cylinder (8) with a small clearance, placed in the extension of the piston head (3) on the side of the compression face (11) and in the axis of said head (3), said sliding skirt (6) being connected to said head (3) by a mechanical inter-skirt connection (7) which enables it to move in longitudinal translation with respect to said head (3);
- at least one pressure transmission channel (10) arranged inside the sliding skirt (6) and passing right through the latter in the axial direction;
- at least one extensible continuous segment (9) of continuous annular form, interposed between the fixed skirt (5) and the sliding skirt (6), and comprising an internal cylindrical segment face (12) subjected to the pressure of the fluid (36) via the pressure transmission channel (10), an external cylindrical segment face (13) capable of coming into contact with the cylinder (8), an axial segment face on the side of the fixed skirt (14) held directly or indirectly in sealed contact with the fixed skirt (5) and an axial segment face on the side of the sliding skirt (15) held directly or indirectly in sealed contact with the sliding skirt (6);
- at least one sliding skirt spring (16) which tends to bring the sliding skirt (6) closer to the fixed skirt (5), and to axially compress the extensible continuous segment (9).

2. Sealing device for a piston according to claim 1, characterized in that the mechanical inter-skirt connection (7) which consists of a mandrel (17) integral with the compression face (11) and co-operating with a mandrel orifice (18) arranged axially in the sliding skirt (6), said mandrel (17) being housed in said orifice (18).

3. Sealing device for a piston according to claim 1, characterized in that the sliding skirt spring (16) is a resilient washer (19) supported on the one hand on the end of the mandrel (17), and on the other hand on the sliding skirt (6).

4. Sealing device for a piston according to claim 1, characterized in that at least one floating plate (21) with an external diameter substantially smaller than the internal diameter of the cylinder (8) is directly or indirectly interposed between the extensible continuous segment (9) and the fixed skirt (5) or between said segment (9) and the sliding skirt (6), the axial segment face on the side of the fixed skirt (14) and/or the axial segment face on the side of the sliding skirt (15) being kept in sealed contact with said plate (21) whilst this latter is traversed by at least one axial plate orifice (31) enabling the mechanical inter-skirt connection (7) to pass through said plate (21).

5. Sealing device for a piston according to claim 4, characterized in that the floating plate (21) includes plate centering means (23) which tend to radially center said plate (21) with respect to the sliding skirt (6) or with respect to the fixed skirt (5), said means (23) being supported directly or indirectly on one or the other of said skirts (5, 6) or on the mechanical inter-skirt connection (7).

6. Sealing device for a piston according to claim 4, characterized in that the floating plate (21) includes a segment groove (22) which co-operates for radial centering of the extensible continuous segment (9) with respect to the sliding skirt (6) or with respect to the fixed skirt (5).

7. Sealing device for a piston according to claim 1, characterized in that the fixed skirt (5) includes at least one scraper segment (24) housed in a scraper groove (25) arranged on the external cylindrical surface of said skirt (5).

8. Sealing device for a piston according to claim 1, characterized in that the external cylindrical segment face (13) includes at least one axial micro-leakage groove (26).

9. Sealing device for a piston according to claim 1, characterized in that the internal cylindrical segment face (12) co-operates with at least one circular sealing joint (32) made of flexible material in order to directly or indirectly produce a seal with the fixed skirt (5) and/or the sliding skirt (6).

10. Sealing device for a piston according to claim 1, characterized in that the axial portion of the length of the internal cylindrical segment face (12) which is closest to the fixed skirt (5) has on average a larger diameter than the axial portion of the length of said internal cylindrical face (12) which is closest to the sliding skirt (6) in such a way that the extensible continuous segment (9) is, over all of its axial length, radially less thick and less rigid on the side of the fixed skirt (5) than on the side of the sliding skirt (6), whilst the external cylindrical segment face (13) for its part remains approximately of the same diameter over all the axial length of said segment (9).

11. Sealing device for a piston according to claim 1, characterized in that at least one extensible continuous unlocking segment (35) of continuous annular form and of which the external diameter is substantially smaller than the internal diameter of the cylinder (8) and which is directly or indirectly interposed between two segment continuous extensible (9), said extensible continuous unlocking segment (35) comprising an internal cylindrical unlocking segment face (37) subjected to the pressure of the fluid (36) via the pressure transmission channel (10), an external cylindrical unlocking segment face (38) which can bring closer together the cylinder (8) and two axial unlocking segment faces (39) each kept directly or indirectly in sealed contact with one of the two extensible continuous segments (9).

12. Sealing device for a piston according to claim 11, characterized in that the sliding skirt (6) has extensible continuous segment centering means (40) which co-operate with the internal cylindrical segment face (12) in order to center the extensible continuous segment (9) with respect to said skirt (6) and/or unlocking segment centering means (41) which co-operate with the internal cylindrical unlocking segment face (37) in order to center the extensible continuous unlocking segment (35) with respect to said skirt (6).

13. Sealing device for a piston according to claim 12, characterized in that the extensible continuous segment (9) and/or the extensible continuous unlocking segment (35) is (are) kept approximately centered with respect to the sliding skirt (6) by a centering ring which is itself centered with respect to said skirt (6) by centering ring centering means (49).

* * * * *